Jan. 29, 1957  M. A. PICCIANO ET AL  2,779,811
PHOTO-CELL CONSTRUCTION
Filed April 21, 1952

INVENTORS
MICHAEL A. PICCIANO
BY CHARLES EKSTEIN

Mitchell & Bechert

ATTORNEYS

United States Patent Office 2,779,811
Patented Jan. 29, 1957

2,779,811

PHOTO-CELL CONSTRUCTION

Michael A. Picciano, Maywood, N. J., and Charles Ekstein, Brooklyn, N. Y., assignors to Vitro Corporation of America, New York, N. Y., a corporation of Delaware Application April 21, 1952, Serial No. 283,320

16 Claims. (Cl. 136—89)

Our invention relates to radiation-responsive cell constructions.

It is an object of the invention to provide improved constructions of the character indicated.

It is also an object to provide an improved construction wherein a plurality of sensitive elements may be supported in physically-spaced relation and electrically connected to each other and to relatively rigid output terminals without subjecting the sensitive elements to undue strain.

Another object is to provide an improved cell construction for a plurality of sensitive elements whereby the elements may be cast in a cell body, integral with relatively rigid electric terminals, and without subjecting the sensitive elements to undue strain.

Figure 1:
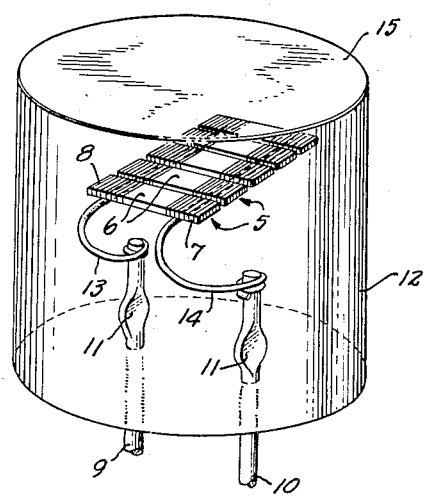
Figure 2:
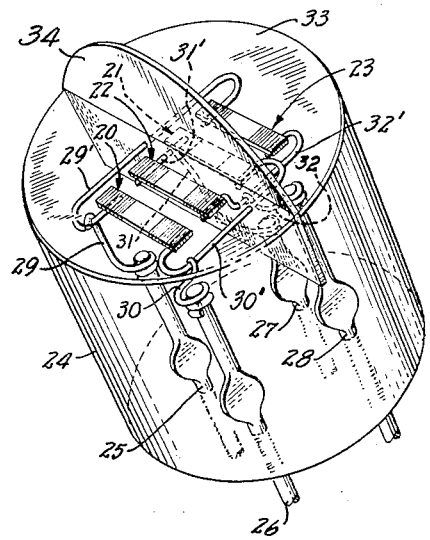
Figure 3:
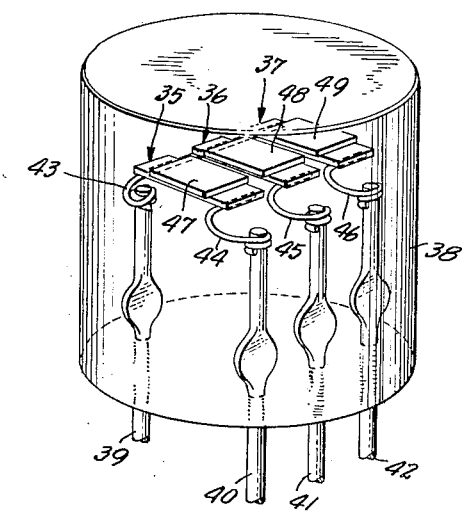

Other objects and various further features of novelty and invention will be pointed out or will become apparent to those skilled in the art from a reading of the following specification, in conjunction with the accompanying drawings. In said drawings, which show, for illustrative purposes only, preferred forms of the invention:

Fig. 1 is an enlarged view, in perspective, of a cell incorporating features of the invention; and Figs. 2 and 3 are similar views to illustrate two alternative constructions.

Briefly stated, our invention contemplates a cell construction employing a plurality of elongated sensitive elements electrically responsive to radiation. Each such element has spaced electric-contact portions which may be connected to each other or separately connected to a plurality of relatively rigid electrical-terminal members. We employ flexible conducting means to establish electrical connections between the terminal members and the contact portions of the sensitive elements, and between contact portions of different sensitive elements. Such assemblies may be cast in an insulating plastic or other material transparent to the radiation to which the sensitive elements are responsive. Various electrically interconnected array configurations are shown and described.

Referring to Fig. 1 of the drawing, our invention is shown in application to a multiple-element cell comprising an array of five radiation-responsive elements 5, disposed in physically spaced relation, and with the sensitive areas 6 aligned and generally in the same plane. The elements 5 may be individual crystals of cadmium sulphide, of zinc sulphide, or of the selenides of these metals, and may each constitute an elongated element with spaced electric-contact portions 7—8. Electrical connection to the elements may be made by means of relatively rigid terminal members 9—10, cast in the same body of plastic as the individual sensitive elements 5; and, if desired, parts 11 of the terminal members 9—10 may be locally weakened within the body of the plastic 12 in order that mechanical shocks sustained by the terminal members 9—10 externally of the cell may be reflected to a minimum extent within the cell.

In accordance with the invention, we provide flexible means for establishing electrical contact between the individual terminal members 9—10, and the electrical contact portions 7—8 of the various elements 5. Conducting ribbons may be employed as the flexible means, but, in the form shown, relatively flexible wires are used. A first such wire 13 connects all electric-contact portions 8, in common and to the terminal member 9, and a second relatively flexible wire 14 similarly connects the electric-contact portions 7. Good electrical contact to the crystals may be promoted by gluing the wires 13—14 to the contact parts 7—8 and by thereafter applying an electrically conductive coating, as, for example, of a material known as "Aquadag," over the entire electric-contact portions 7 and 8, as well as over adjacent parts of the flexible wires 13—14. Such coating is schematically shown in the drawing by shading at the ends of the crystals, and the uncoated areas will be understood to be radiation-responsive.

In practice, the described construction may be safely assembled without damage to the crystals, by first cementing the wires 13—14 to their appropriate crystal-contact areas 7—8. The end 7 may then be dipped in Aquadag to a depth depending upon the desired sensitive area of the crystals, and the other ends 8 may then be similarly treated. The exposed ends of the flexible wires 13—14 may be welded to or coiled around or otherwise electrically connected to the respective terminal members 9—10. The terminal members 9—10 may be temporarily held in spaced relation by clamping means (not shown), in the manner described in the copending application of Charles Ekstein, Ser. No. 277,807, filed Mar. 21, 1952, now Patent No. 2,668,867. The assembly may then be placed in a die, and a radiation-transparent plastic introduced to envelop all the parts with the exception of the exposed ends of the terminals 9—10; we have found the material known as Kelon to be entirely satisfactory for our purposes. After the plastic has set, the top surface 15 of the cell may be ground off or otherwise finished in accordance with application requirements. In the arrangement shown, we prefer that the top surface 15 shall be flat and parallel to the plane of the sensitive areas 6 of the crystals 5.

In Fig. 2, we show an alternative construction embodying principles of the construction of Fig. 1 but achieving a different electrical interconnection of parts. In the arrangement of Fig. 2, four radiation-responsive crystals 20—21—22—23 are cast in spaced relation within a body of plastic 24, along with four electric-terminal member 25—26—27—28; the terminal member 27 is shown shorter than the other terminal members 25—26—28 for the purpose of avoiding confusing interpretation of the drawing. Flexible conducting means again provide electrical connection to the contact portions of the individual crystals, and in the form shown the crystals are bridge-connected, the halves of the bridge being isolated from each other by a radiation barrier 34, which may be a non-conductive member, opaque to the desired radiation. Thus, first flexible means 29—29' connects the terminal 25 with one side of two crystals 20—23; second flexible means 30—30' connects the terminal 26 to one side of two crystals 20—21; third flexible means 31—31' connects the terminal 27 with one side of two crystals 21—22; and fourth flexible means 32—32' connects terminal 28 to one side of two crystals 22—23. Again, we prefer that the top surface 33 of the cell body 24 shall be substantially parallel with the plane of the sensitive areas of the elements 20—22 and 21—23.

We prefer that the barrier 34 shall include a portion cast within the cell body 24 and extending above and below the general plane of elements 20—21—22—23, as shown. Ordinarily, the body 24 will be supported in a housing (not shown) which may of itself constitute a further shield against radiation impinging upon the sensitive areas from all sides except the upper surface 33; alternatively, all sides of body 24 except the exposure side 33 may be coated with a radiation-shielding layer. As to the upper or exposure surface 33, the barrier 34 may be ground flush with the surface 33, but we prefer that the barrier shall project upwardly out of the plane of surface 33, as shown.

In use, elements 20—22 on one side of the barrier 34 may be exposed to one kind of radiation (e. g. an unknown sample), while elements 21—23 on the other side of the barrier may be exposed to another kind of radiation (e. g. a reference source; and when one pair of terminal members (25—27 or 26—28) is electrically energized, the extent of bridge unbalance will electrically reflect the exposed energy difference, at the other pair of terminals (26—28 or 25—27, as the case may be).

Fig. 3 illustrates a further alternative construction wherein three radiation-responsive crystals 35—36—37 are cast in spaced relation in a radiation-transparent body 38, and four relatively rigid terminal members 39—40—41—42 are also cast in spaced relation to each other and to the crystals. The electrical connections are such that flexible means 43 flexibly connects one end of each of the crystals 35—36—37 in common to the terminal member 39, and separate flexible means 44—45—46 connect the other ends of the crystals separately to the terminals 40—41—42. Such a construction will be appreciated as providing a means for discriminating between outputs, as in a directionally responsive application; or, as in the form shown, different selective filters 47—48—49 may be laid over the radiation-responsive areas of the crystals 35—36—37. For example, if the device is to be responsive to visible light, then the filters 47—48—49 may be essentially primary-color filters, so that the separate outputs at 40—41—42, with respect to the common connection 39, may yield a three-color separation in electrical form. Alternatively, the pass-bands of the filters may be more closely spaced and a color-band discrimination may be achieved, as for use in color-control or color-monitoring applications. In either case, it will be understood that radiation shields or barriers (not shown) may be provided as needed and in a manner as suggested in connection with Fig. 2.

The structure of Fig. 3 may be viewed as illustrating a half-bridge configuration, at least as far as any two of the three elements 35—36—37 is concerned. In such an application, filters 47—48—49 may or may not be employed, and, if employed, they may or may not be the same, depending upon the circumstances of intended use. Thus, in a half-bridge use, the terminals 39—40 may provide connection to one side (e. g. the unknown) while the terminals 39—42 provide connection to the other side (e. g. the reference); in such case, connection to the terminal 41 would be neutral or avoided.

It will be appreciated that we have described relatively simple cell constructions featuring extreme ruggedness and insensitivity to mechanical shock and strain. The construction is particularly adapted to multiple-element cells, and we have shown several special purpose arrays.

While the invention has been described in detail for the preferred forms shown, it will be understood that modifications may be made without departing from the scope of the invention as defined in the claims which follow.

We claim:

1. In a cell construction of the character indicated, a plurality of elongated members electrically responsive to radiation and rigidly spaced by solid insulating means, each of said members having electric-contact portions at longitudinally spaced points, a plurality of relatively rigid electric-terminal members rigidly spaced by solid insulating means, and a plurality of relatively flexible conductive members embedded in solid insulating means integral with the insulating means between said members and electrically connecting said terminal members to said contact portions, each of said flexible conductive members being of a length between the electric-contact portion and terminal member associated therewith exceeding the minimum distance between said terminal members and said electric-contact portions.

2. In a cell construction of the character indicated, a plurality of elongated sensitive members electrically responsive to radiation, each of said members having electric-contact portions at longitudinally spaced points, a plurality of relatively rigid electric-terminal members, a solid body of electrically insulating plastic material transparent to radiation and in which said members are cast in physically separated relation, and flexible conducting means embedded in said solid body of plastic material and electrically connecting said terminal members to said contact portions, said flexible conducting means being of excessive physical length and looped between connections to said terminal members and to said electric-contact portions.

3. A construction according to claim 2, in which the sensitive areas of said sensitive members are disposed in a given surface, and in which the adjacent surface of said body is substantially parallel to said given surface.

4. A device according to claim 15, in which a single flexible conductor connects electric-contact portions of two of said radiation-responsive members to one of said terminal members.

5. A construction according to claim 15, in which one of said radiation-responsive members is a cadmium-sulphide crystal.

6. A device according to claim 15, in which said second wire contacts the other electric-contact portions of said plurality of crystal elements, whereby said crystal elements are connected in parallel to said terminal members.

7. A device according to claim 15, in which the other contact portions of a plurality of said crystals are separately flexibly connected to a plurality of said terminal members.

8. A device according to claim 16, in which a single filtering element overlies the sensitive area of one of said crystal elements to the exclusion of the sensitive area of another of said crystal elements.

9. In a device of the character indicated, a solid body of plastic material transparent to radiation and containing four physically separated radiation-responsive crystals, each having two electric-contact portions at spaced points thereon, four relatively rigid terminal members cast in said plastic in physically separated relation with respect to each other and with respect to said crystals, and four relatively flexible connecting members, each of which electrically connects one of said terminal members in common with an electric-contact portion on each of two of said crystals, whereby said crystals are bridge-connected, with said terminal members at the corners of the bridge.

10. A device according to claim 9, and including barrier means opaque to the radiation to which said crystals are responsive and physically disposed between two adjacent crystals.

11. A device according to claim 10, in which said crystals are substantially aligned in a row and in which said barrier means is between the center two crystals.

12. A device according to claim 10, in which said barrier means extends above and below the general plane of said crystals.

13. A device according to claim 10, in which said barrier means extends within said body above the general plane of said crystals and externally of said body above said plane.

14. A device according to claim 10, in which said barrier means divides said crystals symmetrically, the two crystals on one side of said barrier means being on opposite legs of the bridge connection, and the two crystals on the other side of said barrier means being on the other opposite legs of the bridge connection.

15. In a cell construction of the character indicated, an array of physically separated elongated members electrically responsive to radiation and cast in a solid body of an electrically insulating material transparent to the radiation to which said members are responsive, each of said members having electric-contact portions at longitudinally spaced points, a plurality of relatively rigid electric-terminal members, said insulating material rigidly holding said terminal members in physically separated relation, and flexible conducting means wholly supported by said insulating material and electrically connecting said members to said contact portions, said flexible conducting means being of a length between said terminal members and said contact portions exceeding the minimum straight-line distance between said terminal members and said contact portions.

16. In a cell construction of the character indicated, a plurality of radiation-responsive crystal elements with electric-contact portions at spaced points thereon, a plurality of relatively rigid electric-terminal members, a solid body of electrically insulating plastic material transparent to radiation with said elements and said members embedded therein, a first relatively flexible conducting wire embedded in said material and contacting contact portions on a plurality of said crystal elements and connected to one of said terminal members, and a second relatively flexible conducting wire embedded in said material and connecting the other contact portion of one of said crystal elements to another of said terminal members, each of said conducting wires being of a length between the terminal member and the first crystal element connected thereto exceeding the straight-line distance between such terminal member and first crystal element, whereby the excessive lengths of flexible wire may mechanically isolate said crystal elements from said terminal members.

References Cited in the file of this patent

UNITED STATES PATENTS

| | | |
|---|---|---|
| 1,266,473 | Hoxie | May 14, 1918 |
| 1,345,586 | Coblentz | July 6, 1920 |
| 1,647,652 | Murray | Nov. 1, 1927 |
| 1,697,451 | Baird | Jan. 1, 1929 |
| 2,030,187 | Salzberg | Feb. 11, 1936 |
| 2,055,017 | Praetorius et al. | Sept. 22, 1936 |
| 2,582,850 | Rose | Jan. 15, 1952 |
| 2,586,609 | Burke | Feb. 19, 1952 |

OTHER REFERENCES

Ser. No. 395,872, Addink (A. P. C.), published May 18, 1943.